United States Patent [19]
DeNeefe et al.

[11] 3,737,022
[45] June 5, 1973

[54] RAPID RETRACTING TORQUE ACTIVATED DRIVE ROLLER UNIT FOR CONVEYOR SYSTEMS

[75] Inventors: John H. DeNeefe, Cerritos; Conrad Pistel, Fullerton; John G. Schwarzbeck, Downey, all of Calif.

[73] Assignee: Western Gear Corporation, Lynwood, Calif.

[22] Filed: Apr. 14, 1972

[21] Appl. No.: 244,306

Related U.S. Application Data

[63] Continuation of Ser. No. 80,709, Oct. 14, 1970, abandoned.

[52] U.S. Cl. ............................198/127 R, 74/242.9
[51] Int. Cl. ..............................................B65g 13/02
[58] Field of Search............198/127 R, 127 E; 74/242.9

[56] References Cited

UNITED STATES PATENTS 2,753,724  10/1956  Leyer et al. .....................74/242.9

Primary Examiner—Evon C. Blunk
Assistant Examiner—Hadd Lane
Attorney—Herbert A. Huebner

[57] ABSTRACT

Improvements in a torque controlled power roller unit for propelling loads along a conveyor plane defined by associated load-supporting means, in which the roller normally is disposed below the conveyor plane and is translated into contact with a load by the same drive means which also rotates the roller. The improvements facilitate the restoration of the roller to a position below the conveyor plane and out of contact with the load, upon cessation of power operation, and include a planetary drive train located in relation to the roller and roller translating mechanism so as to minimize drive train friction incident to such restoration; employment of a variable restraint upon roller rotation which reduces resistance to roller rotation during such restoration; and provision of a torque spring to assist in such restoration.

8 Claims, 15 Drawing Figures

Patented June 5, 1973

INVENTORS.
JOHN H. DE NEEFE
CONRAD PISTEL
JOHN G. SCHWARZBECK
BY Huebner & Worrel
ATTORNEYS.

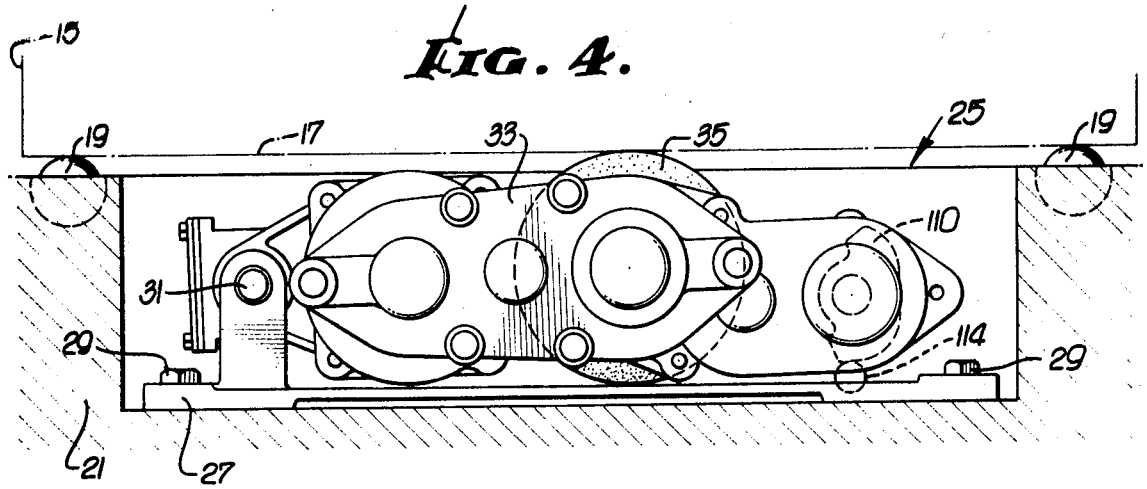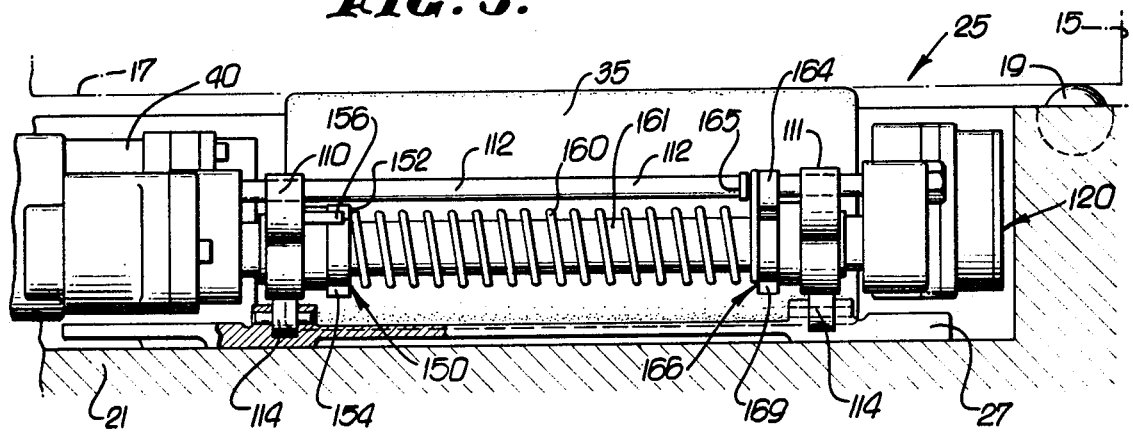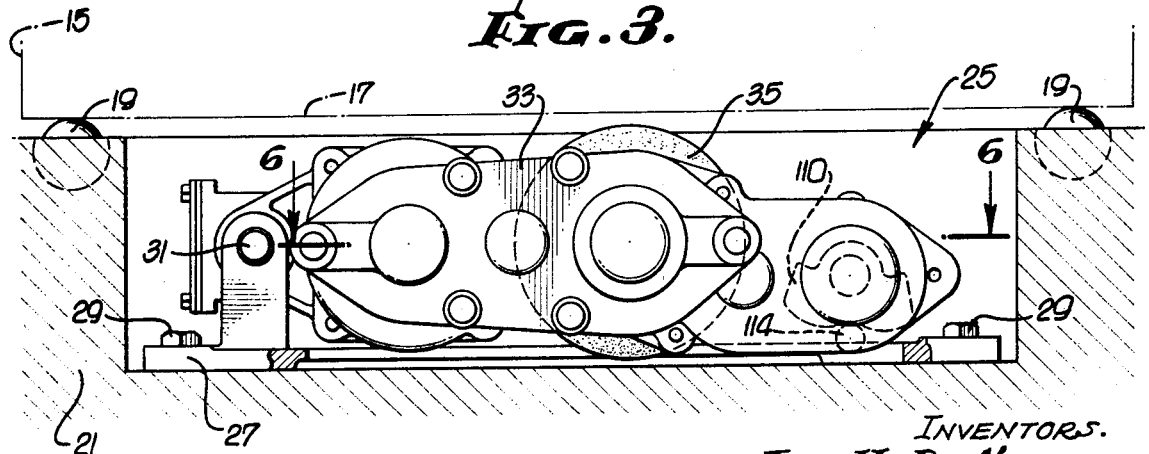

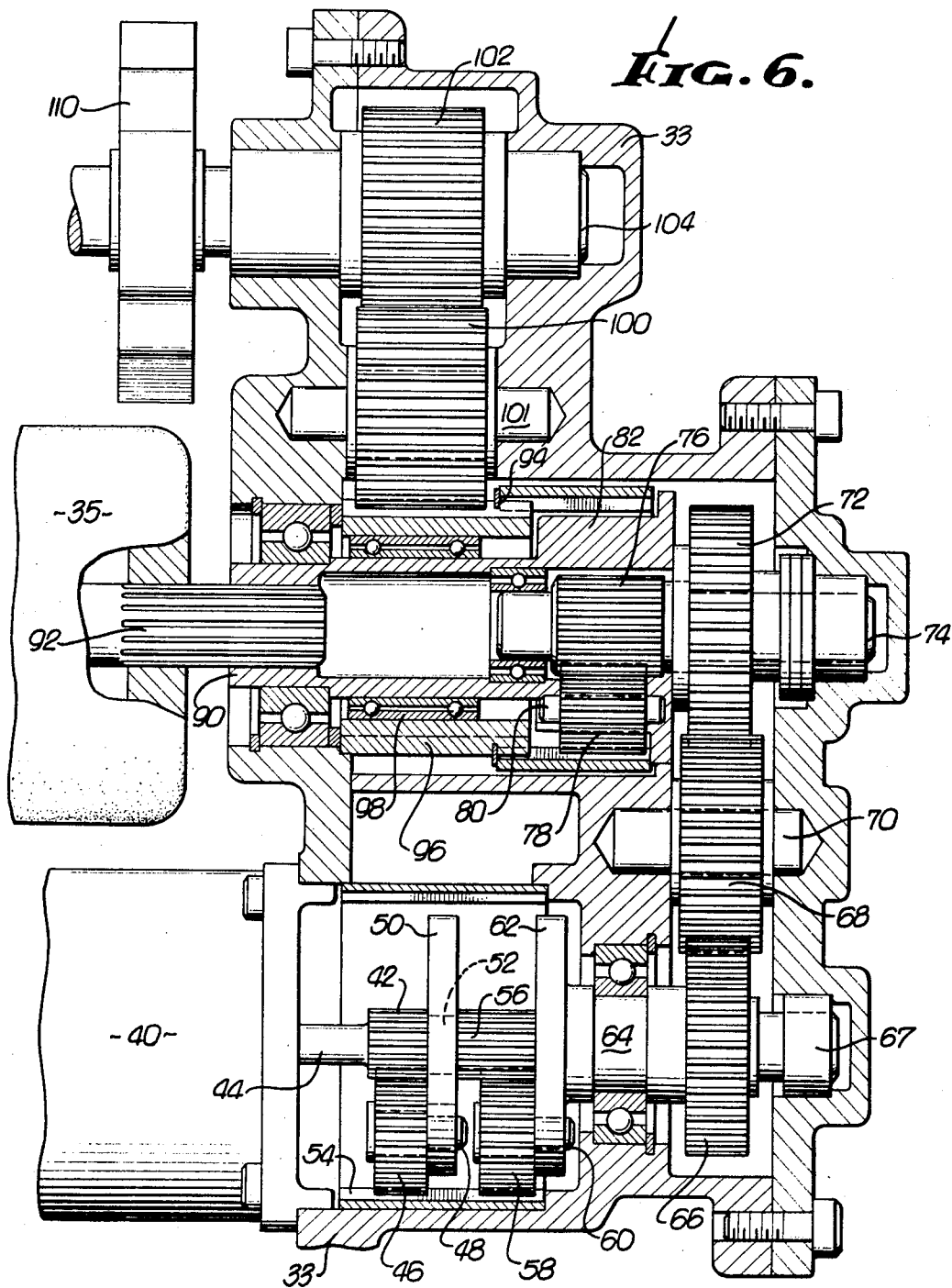

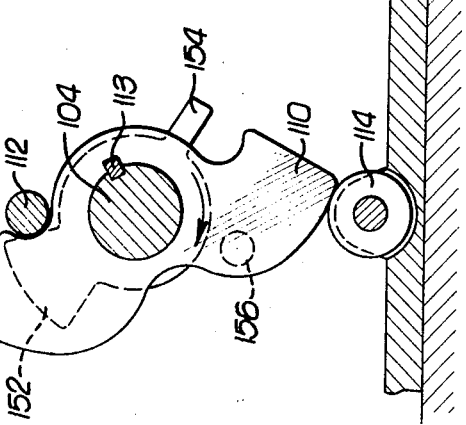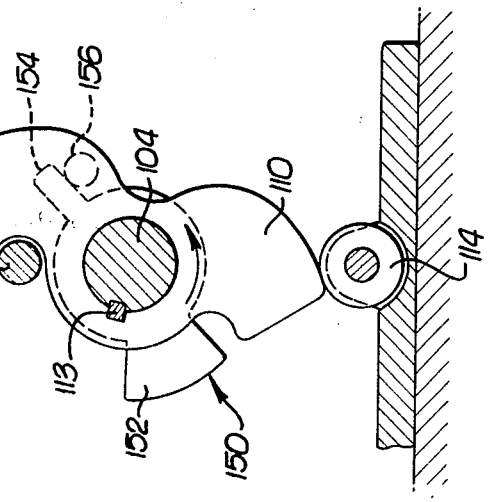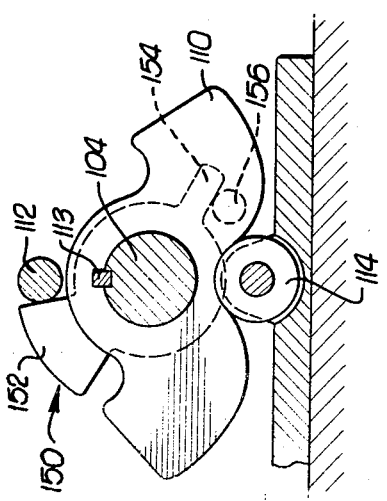

Patented June 5, 1973

INVENTORS.
JOHN H. DE NEEFE
CONRAD PISTEL
JOHN G. SCHWARZBECK
BY
Huebner & Worrel
ATTORNEYS.

Patented June 5, 1973

INVENTORS.
JOHN H. DE NEEFE
CONRAD PISTEL
JOHN G. SCHWARZBECK
By
Huebner & Worrel
ATTORNEYS.

RAPID RETRACTING TORQUE ACTIVATED DRIVE ROLLER UNIT FOR CONVEYOR SYSTEMS

This is a continuation of application Ser. No. 80,709, filed Oct. 14, 1970, now abandoned.

CROSS-REFERENCE TO RELATED APPLICATION

The present invention is directed to improvements on the invention disclosed and claimed in Schwarzbeck U. S. Pat. Application Ser. No. 826,466 filed May 21, 1969 for Torque Controlled Power Roller for Conveyor System.

BACKGROUND OF THE INVENTION

1. Field of the Invention

Conveyors for delivering loads from one location to another are in wide general use in the handling of baggage and cargo at air terminals, of merchandise in warehouses, and the like. In many instances the loads to be conveyed move over the surface of such conveyors by gravity, but in applications in which gravity or manual movement of loads along the conveyor is impractical, propulsion rollers have been incorporated into such systems.

The above identified related application discloses a power roller unit for conveyor systems adapted to be mounted below a conveyor plane defined by associated load supporting means and comprising a roller mounted for rotational movement in either direction and for translational movement toward and away from said plane. A power source is provided which both rotates the roller and translates it into frictional contact with a load disposed on the conveyor plane; the roller being retractable out of contact with such a load upon de-energization of the power source.

2. Description of the Prior Art

Such devices comprise, in general, a drive train comprising, for example, planetary gearing, in which an input element such as a sun gear is adapted to be rotated by a source of power such as an electric motor, to drive two output elements such as a spider mounting planetary gears meshing with the input gear and a ring gear meshing with such planetary gears. When the spider is restrained against rotation, additional power is proportionately directed to the ring gear, while when the ring gear is restrained against rotation, additional power is proportionately directed to the spider. In such an arrangement, rotation of the spider is employed to rotate the power drive roller, while rotation of the ring gear is employed to cause the power drive roller to be translated into frictional contact with a load at the conveyor plane.

In such arrangements, it is desirable to insure that retraction of the drive roller out of frictional contact with a load on the conveyor plane will take place rapidly whenever rotation of the power input element is arrested, as, for instance, when the electric motor is stopped.

Such rapid retraction of the drive roller has been impeded in devices of the character described by reason of the necessity for providing a restraint upon rotation of the power roller in order to insure an application of power to the roller translating mechanism adequate to translate the roller into contact with the load. On the other hand, it is necessary to freely rotate the power drive roller in a reverse direction as an incident to its retraction from frictional contact with the load because the power drive train between the motor and the power input element of the planetary gearing is effectively locked when the power is shut off. Thus the restraint applied to rotation of the roller may prevent its rapid retraction when when the motor is stopped.

SUMMARY OF THE INVENTION

The device of the present invention avoids the difficulty experienced in effecting rapid retraction of the power roller in devices of the character described, by providing, in such a combination, a means for imposing a restraint upon rotation of the power roller varying directly with the speed of rotation of such roller, so that, when power is applied from a motor to effect rotation of the roller at a relatively high speed, the drag imposed upon the roller will be ample to cause an application of power to the roller translating mechanism adequate to insure translation of the roller firmly into frictional contact with the load at the conveyor plane. However, when the motor is arrested and retraction of the roller out of contact with a load on the conveyor plane commences, accompanied by reverse rotation of the roller at a relatively low speed, the drag imposed upon the roller's rotation will be relatively small and therefore will not significantly impede the retraction of the roller. The same conditions exist regardless of the direction in which the roller is rotated by the motor drive means.

Desirably, in addition to the variable restraint described above, there is also provided means energized by the motor drive, such as a torque spring, operable upon cessation of power operation to drive the roller translating means in the reverse direction to that in which it was driven by the motor in translating the roller into contact with a load on a conveyor plane, thus insuring and expediting the roller retracting operation.

Preferably, also, the planetary gearing arrangement described above, or the like, is arranged to drive the roller translating mechanism through gearing having a ratio and a low frictional resistance such that the torque spring or the like which drives the roller translating mechanism in a retrograde direction during the roller retracting operation will not encounter significant resistance in effecting reverse rotation of the drive roller itself during such operation.

BRIEF DESCRIPTION OF THE DRAWING

FIG. 3 is a view in side elevation of the driving unit of FIG. 2 as viewed from the line 3—3, showing the roller positioned out of contact with a load disposed at the conveyor plane;

FIG. 4 is a view in side elevation corresponding to FIG. 3, but showing the roller positioned in contact with a load at the conveyor plane;

FIG. 5 is a view in end elevation as viewed from the plane indicated by the line 5—5 of FIG. 2, showing the roller positioned in contact with a load at the conveyor plane;

FIG. 6 is a detail plan view in section of the drive assembly for the drive roller, the section being taken along the plane indicated by the line 6—6 of FIG. 3;

FIG. 7 is a view in end elevation of the device as viewed from the same plane as FIG. 5, but showing the roller lowered out of contact with a load at the conveyor plane;

FIGS. 8, 9 and 10 are detail views, partly in section, of the cam arrangement for actuating the roller translating mechanism, all as viewed from a plane indicated by the line 8—8 of FIG. 7;

DESCRIPTION OF THE PREFERRED EMBODIMENT

Figure 1:
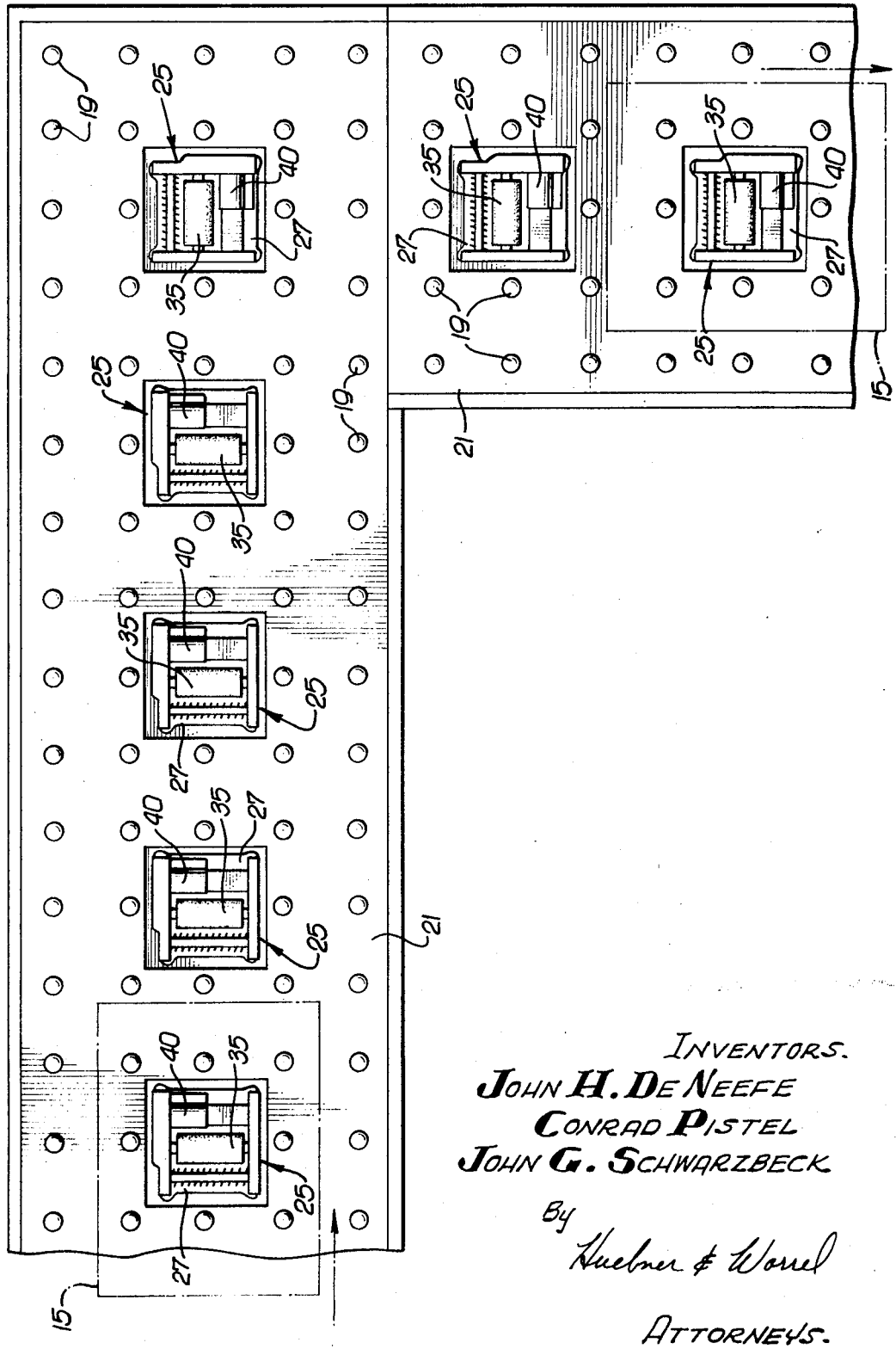
FIG. 1 is a plan view of a section of a conveyor system provided with a series of drive units embodying the present invention; the position of loads being transported by the conveyor being indicated by rectangles in broken lines.

The power operable roller mechanism of the present invention is designed for incorporation in a conveyor system such as that portions of which are illustrated in FIGS. 1 to 5 and 7. In such systems, loads such as cartons, indicated in broken lines at 15, are movable along a conveyor plane 17 (FIGS. 3 to 5) defined by associated load supporting means such as balls 19 freely rotatable in a common frame structure 21.

Propulsion roller units 25 (FIG. 1) embodying the present invention are designed to be incorporated in such a system, being preferably disposed between parallel rows of the balls 19. The propulsion roller units 25 of the present invention, as shown in FIG. 2, comprise a base 27 adapted to be attached, as by bolts 29, to the conveyor frame 21.

Pivotally mounted on the base 27 at 31 (FIGS. 2, 3 and 4) is a rockable frame 33 carrying a propulsion roller 35 which is rotatably mounted in the frame 33; the frame 33 thus constituting means mounting the roller 35 for rotation and for translational movement with respect to the conveyor plane 17.

Drive means are provided which are effective upon restraint against rotation of the roller 35 to cause rocking movement of the frame 33 on its pivotal mounting 31 so as to effect translational movement of the roller 35 toward the conveyor plane 17, and responsive to arrest of such translational movement, as by contact of the roller 35 with a load 15 carried by the conveyor or by a limit stop hereinafter described, to effect rotation of the roller 35 for the purpose of propelling a load along the conveyor. By virtue of the relationship between the axis of roller 35 and the relative position of the pivotal mounting 31, the center of gravity of the frame 33 is disposed between the roller axis and the pivotal mounting 31.

Figure 2:
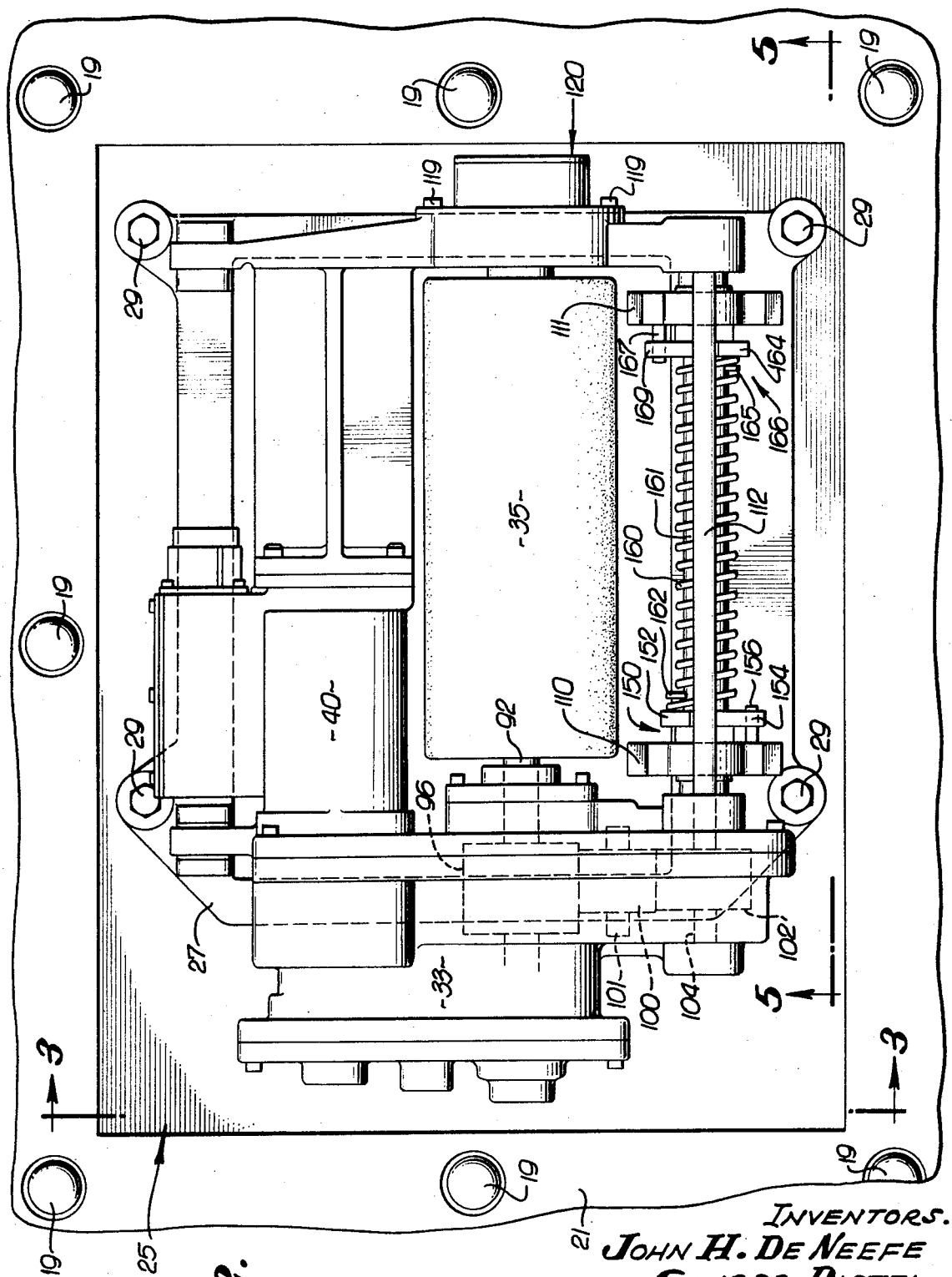
FIG. 2 is a view in plan of a driving unit embodying the present invention.
Figure 11:
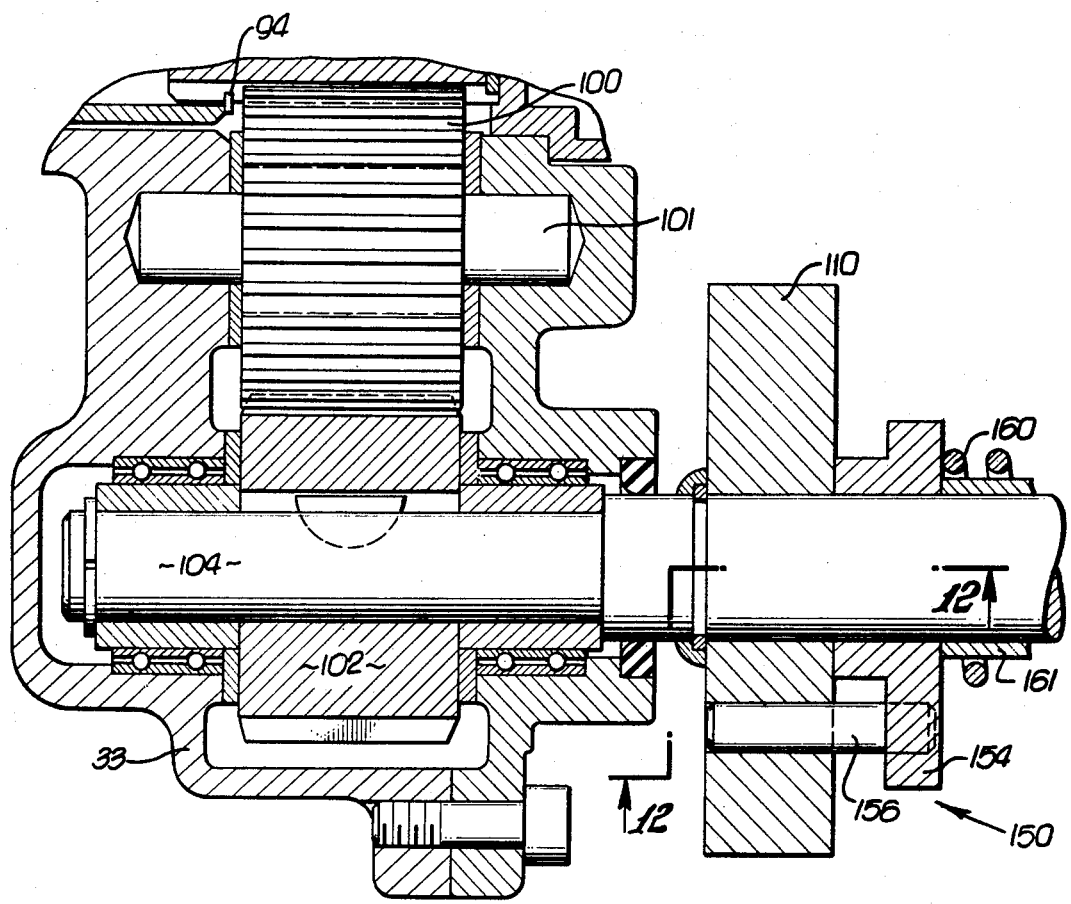
FIG. 11 is a detail view in section of a portion of the drive for the roller translating mechanism.

As shown in FIGS. 2 and 6, this means comprises an electric motor 40 mounted in the rocking frame 33. The motor 40 drives a compound speed reducing gear train comprising a spur gear 42 (FIG. 6) secured to shaft 44 of motor 40 and meshing with a planet gear 46 rotatably mounted on a stub shaft 48 carried by a spider 50 rotatably mounted on a shaft 52. The planet gear 46 also meshes with an internal ring gear 54 fixed within the frame 33.

The spider 50 is secured to a spur gear 56 which is also rotatably mounted on the shaft 52, and the spur gear 56 meshes with a second planet gear 58 mounted on a stub shaft 60 carried by a spider 62 which is likewise rotatably mounted on the shaft 52. The planet gear 58 also meshes with the fixed ring gear 54.

The spider 62 is integrally connected by way of a journaled hub 64 to a spur gear 66 rotatably mounted in a bearing 67 in the frame 33. Gear 66 transmits its rotation through an idler gear 68 rotatably mounted on a shaft 70 to a spur gear 72 secured to a shaft 74 journaled in the frame 33. A spur gear 76 is also secured to the shaft 74 and meshes with a planet gear 78 journaled on a stub shaft 80 carried by a spider 82 also journaled in the frame 33. The planet gear 78 also meshes with an internal ring gear 84 rotatably mounted within the frame 33. A sleeve extension 90 of the spider 82 is internally splined to receive the externally splined end of a shaft 92 to which the drive roller 35 is fixed.

The ring gear 84 is keyed at 94 to a spur gear 96 journaled on a bearing 98 carried on the sleeve extension 90 of the spider 82. The gear 96 transmits its rotation through an idler gear 100 rotatably mounted on a shaft 101 carried in the frame 33 to a spur gear 102 fixed to a shaft 104 journaled in the frame 33.

This arrangement is such that upon the application of a restraint against rotation of the roller 35 by means hereinafter described, the spider 82 will be similarly restrained against rotation, whereupon rotation of the sun gear 76 will act through planet gear 78 to effect rotation of the ring gear 84, spur gear 96, and through idler gear 100, gear 102 and shaft 104. When shaft 104 is restrained against rotation, as by arresting translational movement of the frame 33 and roller 35, as hereinafter described, the ring gear 84 will be similarly restrained against rotation and continuing rotation of the sun gear 76 will then act to cause the planet gear 78 to revolve within the ring gear 84 to effect rotation of the spider 82 and through extension 90 thereof and shaft 92 to rotate the roller 35.

Figure 12:
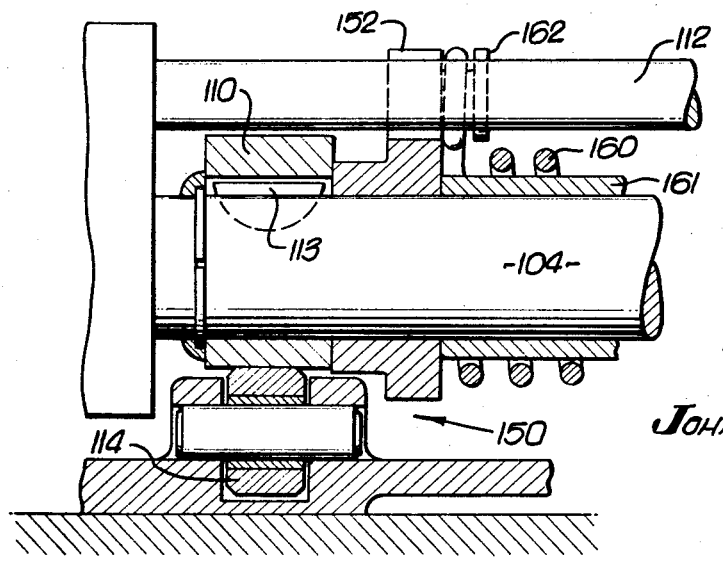
FIG. 12 is a detail view in compound section taken on the line 12—12 of FIG. 11.

Translational movement of the roller 35 toward the conveyor plane 17 by rocking of the carriage 33 about its pivotal mounting 31 is accomplished upon rotational movement of shaft 104 by a pair of lift cams 110 and 111 each of which is keyed to the shaft 104 as indicated at 113 in FIG. 12. When the frame 33 is in its lowered position in which the roller 35 is below the conveyor plane 17, the cams 110 and 111 are in the position in which cam 110 is shown in FIGS. 3, 7 and 8.

Rotation of the shaft 104 in a counterclockwise direction, as viewed in FIGS. 8, 9 and 10, will drive the cams 110 and 111 from the position illustrated in FIG. 8 to the position illustrated in FIG. 9 where further movement will be arrested (unless it has already been arrested by engagement of roller 35 with a load) by engagement of the cams 110 and 111 with a shaft 112 secured in the frame 33. During such movement, a face of each of the cams 110 and 111 engages a roller 114 journaled in the main frame 27 to cam the shaft 104 and the rocking frame 33 from the position in which it is shown in FIGS. 3, 7 and 8 to the position in which it is shown in FIGS. 4, 5 and 9. Similarly, when the shaft 104 is rotated in the opposite, or clockwise, direction from the position in which it is shown in FIG. 8 to the position in which it is shown in FIG. 10, where it may likewise be arrested by engagement of a portion of the cams 110 and 111 with the fixed shaft 112, the shaft 104, rocking frame 33, and roller 35 will be cammed upwardly from the position in which the parts are shown in FIGS. 3, 7 and 8 to the position in which the frame 33 and roller 35 are shown in FIGS. 4 and 5 and in which the cam 110 is shown in FIG. 10.

It will be apparent that when the rocking frame 33 and roller 35 are returned from the position in which they are shown in FIGS. 4 and 5 to the position in which they are shown in FIGS. 3 and 7, retrograde movement of the shaft 104 either from the position in which it is shown in FIG. 9 or the position in which it is shown in FIG. 10 to the position in which it is shown in FIG. 8 will necessarily take place. Such retrograde movement of the shaft 104 acts through the gear 102, idler 100, gear 98, ring gear 84 and planetary gear 78 to cause rotation of the spider 82, since the sun gear 76, whenever the motor 40 is stopped, is effectively locked in a fixed position. Rotation of the spider by this means rotates the roller 35 in the opposite direction to that in which it was previously being driven by the motor 40. The amount of such rotation is small, however, since the angular displacement of shaft 104 is only about 90° in each direction from its normal, centralized, position. Furthermore, the means, hereinafter described, for rocking the shaft 104 from either of its extreme positions back to its centralized position is afforded a mechanical advantage in rotating the roller 35, since the gearing 96, 100, 102 is in a one-to-one ratio, while the ring gear 84 driving the spider 82 through the planetary gear 78 has a greater angular movement than the spider 82.

Means are provided for applying a yielding restraint upon rotation of the roller 35; a fluid friction assembly being employed so that, when rotation of the shaft 92 and roller 35 at full speed by the motor is initiated, the retraint upon rotation of the roller will be significantly greater than when retrograde rotation of the shaft 92 and roller 35 as an incident to retrograde rocking of the shaft 104 (FIGS. 8, 9 and 10) from either its FIG. 9 or FIG. 10 position to its FIG. 8 position, as previously described, takes place.

Figure 13:
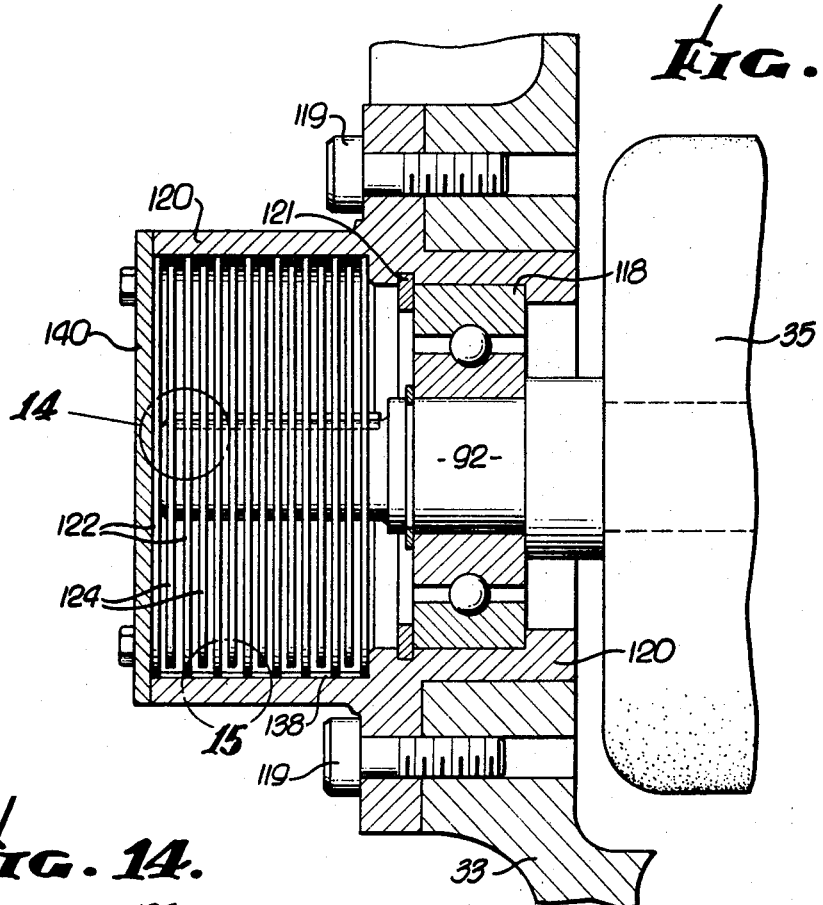
FIG. 13 is a detail view, partly in section, of the device for imposing a variable restraint on the power roller.
Figure 14:
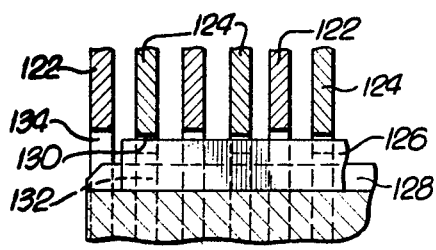
FIG. 14 is an enlarged detail view of a portion of the device of FIG. 13 within the area indicated by the circle 14 of FIG. 13.
Figure 15:
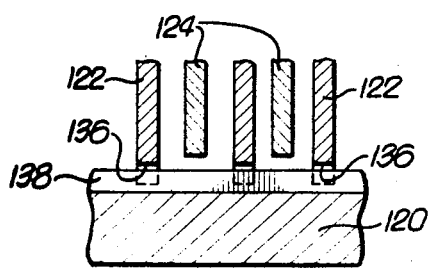
FIG. 15 is an enlarged detail view of a portion of the device of FIG. 13 within the area indicated by the circle 15 of FIG. 13.

As shown in FIGS. 13, 14 and 15, this fluid friction device 120 is carried by the frame 33 at a position adjacent the end of the roller 35 opposite that shown in FIG. 6 to which the driving connection to the shaft 92 is applied. As shown in FIG. 13, the shaft 92 is journaled in a bearing 118 secured within a cylindrical casing 120, as by retaining ring 121; the casing 120 being secured to the frame 33 by means such as bolts 119.

Interspersed stationary disks 122 and rotating disks 124 are disposed within the casing 120, the rotating disks 124, as shown in FIG. 14, being removably secured to the shaft 92 by means of a key 126 engaging a keyway 128 in the shaft 92 and notches 130 in the peripheries of central apertures 132 of the disks 124.

The interspersed stationary disks 122 are provided with central apertures 134 of sufficient diameter to enclose the shaft 92 and its key 126, as shown in FIG. 14, and are secured in position, as shown in FIG. 15, by means of notches 136 in the periphery of each disk 122 engageable with an internal rib 138 formed on the interior wall of the casing 120.

The interior of the cylindrical casing 120 is designed to be at least partially filled with a viscous fluid such as, for example, "Viscasil" 30,000 silicone fluid manufactured by the General Electric Company, so that upon rotation of the shaft 92 and rotating laminations 124, the friction between the rotating disks 124, the viscous fluid and the stationary disks 122 will impose a yielding restraint upon the rotation of the shaft 92 and roller 35.

The structure of this friction device is based upon well-known principles utilized, for example, in hydraulic transmissions. Thus, plates, discs, or co-axial cylinders, disposed with mutually adjacent surfaces between which a viscous liquid or a dry powder is present, will operate with 100% or at least very substantial slippage at the commencement of rotation of the input shaft. As the speed of the input shaft increases the slippage decreases, and when the input shaft stops the maximum slippage again prevails. When such a structure is employed as a brake, i.e., the output element is restrained against rotation, the braking action increases with speed of input, and decreases to a minimum when the input is stopped.

In the structure herein disclosed the employment of a yielding restraint of the character described eliminates the possibility that the roller will be prevented from retracting to a position out of contact with the load. This is because the resistance to rotation of the roller presented by the fluid friction device, while high enough to insure elevation of the roller when motor power is applied to drive the roller, becomes negligible when gravity or a torque spring employed to effect lowering of the roller starts rotation of the roller very slowly in a retrograde direction.

Because the retrograde movement of the shaft 104 (FIGS. 8, 9 and 10) from the position in which it is shown in FIG. 9 or the position in which it is shown in FIG. 10 to the position in which it is shown in FIG. 8 requires retrograde movement of the shaft 92 and roller 35, as previously described, and because the faces of the cams 110 and 111 in contact with the rollers 114 have gradually increasing radii of curvature outwardly from their central points in contact with the roller 114, as indicated in FIG. 8, in order to insure movement of the roller 35 firmly into engagement with a load on the conveyor plane, means are provided for propelling the shaft 104 from either the position in which it is shown in FIG. 9 or the position in which it is shown in FIG. 10 back to the position in which it is shown in FIG. 8 upon cessation of the application of power from the motor 40.

As shown in FIGS. 2 and 7 to 12, there is rotatably mounted on the shaft 104 adjacent the cam 110 a member 150 having an extension 152 which, in the position in which the parts are shown in FIG. 8, abuts one side of the shaft 112. Another extension 154 of the member 150, in the same position of the parts, abuts a pin 156 integral with the adjacent cam 110 so that, upon movement of the cam 110 from the position in which it is shown in FIG. 8 to the position in which it is shown in FIG. 9, the member 150 will be moved from the position in which it is shown in FIG. 8 to the position in which it is shown in FIG. 9.

A torsion spring 160 surrounding a sleeve 161 (FIGS. 11 and 12) enclosing the shaft 104 has one end thereof anchored to a pin 162 integral with the member 150, its opposite end being anchored to a pin 165 integral with a member 166 which is in all respects identical with the member 150 except that its extension 164 corresponding to the extension 152 of the member 150 abuts the side of the shaft 112 opposite to the side abutted by the extension 152 of the member 150, and in that a pin 167 on the adjacent cam 111 abuts the side of an extension 169 of the member 166 corresponding to the extension 154 of the member 150 which is opposite the side abutted by the pin 156 of the cam 110 adjacent the member 150.

This arrangement is such that when the shaft 104 is rocked counterclockwise from the position in which it is shown in FIG. 8 to the position in which it is shown in FIG. 9, moving the member 150 with it, the end of the spring 160 anchored to pin 162 is carried along with the member 150, while the opposite end of the spring 160 anchored to the pin 165 remains stationary; the shaft 112 blocking the member 166 against movement in the same direction as the member 150.

The torsion spring 160 being thus tensioned as an incident to the rocking movement of the shaft 104 from the position in which it is shown in FIG. 8 to the position in which it is shown in FIG. 9 is effective upon cessation of the application of power to the drive train from the motor 40 to propel the member 150 from the position in which it is shown in FIG. 9 to the position in which it is shown in FIG. 8. During such movement, the extension 154 of the member 150 engages the pin 156 integral with the cam 110 to return the cam to the position in which it is shown in FIG. 8.

When the motor is reversed to drive the unit in the opposite direction, the shaft 104 is rocked clockwise from the position in which it is shown in FIG. 8 to the position in which it is shown in FIG. 10, and in the course of this movement, the member 150 remains in its original position as shown in FIG. 10; the pin 156 integral with the cam 110 merely moving away from the extension 154 of the member 150, as illustrated in FIG. 10.

In the course of such movement of the shaft 104, however, the spring 160 is tensioned by movement of the member 166 to which the opposite end of the spring 160 is anchored at 165; the member 166 being engaged by a pin on its adjacent cam 110 corresponding to the pin 156 of the member 150, but disposed on the opposite side of an extension 169 of the member 164 corresponding to the extension 154 of the member 150. Corresponding rotation of the member 150 during such movement of the member 164 is prevented by the abutment of the extension 152 of the member 150 against the opposite side of the shaft 112.

The spring 160, being thus oppositely tensioned during the movement of the shaft 104 from the position in which it is shown in FIG. 8 to the position in which it is shown in FIG. 10, is effective upon cessation of the application of power to the drive train from the motor 40 to propel the member 164 and, through its adjacent cam 111, the shaft 104 back to the position in which the latter is shown in FIG. 8.

In either direction of operation, the return of the shaft 104 from the position in which it is shown in FIG. 9 or the position in which it is shown in FIG. 10 to the position in which it is shown in FIG. 8 permits the rocking frame 33 to return by gravity from the position in which it is shown in FIGS. 4 and 5 to the position in which it is shown in FIGS. 3 and 7, thus translating the roller 35 into a position out of the conveyor plane 17.

We claim:

1. A power-operable roller mechanism for propelling loads along a conveyor plane defined by associated load-supportng means comprising a base, a frame carried by said base, translatable with respect thereto from a normal position below said conveyor plane toward said plane and returnable by gravity to said normal position, a drive roller rotatably mounted on said frame, an actuating mechanism for translating said frame toward said conveyor plane comprising a rockable shaft, cam means carried by said shaft for translating said frame toward said conveyor plane upon rocking movement of said shaft away from its normal position of rest, drive means for simultaneously and individually applying rotational torque to said roller and rocking said shaft and means comprising a spring tensionable by said drive means upon operation thereof for effecting retrograde movement of said shaft to its said normal position of rest upon interruption of the operation of said drive means, thereby permitting return of said frame to its said normal position.

2. A power-operable roller mechanism according to claim 1 in which said rockable shaft is rockable in either direction from a normal central position and in which said cam means effects translation of said frame toward said conveyor plane upon rocking movement of said shaft in either direction.

3. A power-operated roller mechanism according to claim 1 in which said cam means comprises a cam having a radius of curvature of its effective portion which is progressively increasing as said means translates said frame toward said conveyor plane.

4. In a power roller mechanism for propelling loads along a platform having freely rotatable means for supporting such loads along a laterally extending plane thereon a rotatable drive roller having an axis disposed parallel to said plane, means for supporting said roller for translatory movement under power into, and for free gravitational movement out of a position in which it is tangential to said load plane and in tractional engagement with a load supported thereon comprising a pivotal mounting for said supporting means laterally displaced from said roller axis; said supporting means having its center of gravity located between said pivotal mounting and said roller axis whereby gravity is effective to normally maintain said roller out of its position tangential to said load plane and out of tractional engagement with a load supported thereon, a power means and means operable by said power means for rotating said roller on its axis and actuating said supporting means to cause the same to translate said roller into its position tangential to said load plane and in traction with a load supported thereon, and effective upon cessation of operation of said means by said drive train to permit gravitational return of said supporting means to remove said roller from said position; said last named means including a device applying a yielding restraint upon rotation of said roller which restraint decreases in magnitude as the speed of rotation of said roller decreases.

5. A power roller mechanism according to claim 4 in which said device applying a yielding restraint upon restraint of said roller comprises a liquid-containing reservoir and an element connected to and rotatable with said roller; said element being immersed in the liquid in said reservoir.

6. A power roller mechanism according to claim 4 wherein the device applying the yielding restraint comprises juxtaposed members with complemetary surfaces spaced apart, flowable material between the surfaces, one member being fixed, the other being rotatable, and an input from the power means is coupled to the rotatable member.

7. A power-operable roller mechanism for propelling loads along a conveyor plane defined by associated load-supporting means comprising a drive roller, means mounting said roller for rotation and for translational movement with respect to said conveyor plane, drive means for simultaneously and individually applying rotational torque to said roller and translating the same toward said conveyor plane; said drive means including a portion operable in response to translation of said roller away from said conveyor plane to cause retrograde rotation of said roller, and means for applying a yielding restraint upon rotation of said roller proportional in magnitude to the speed of rotation of said roller, said last named means comprising a liquid-containing reservoir disposed coaxially with said roller adjacent one end thereof, a first series of spaced plates fixed within said reservoir, a second series of plates interspersed between said fixed plates and connected to and rotatable with said roller; both said fixed plates and said rotatable plates being at least partially immersed in the liquid in said reservoir.

8. A power-operable roller mechanism for propelling loads along a conveyor plane defined by associated load-supporting means comprising a base, a frame carried by said base and translatable with respect thereto toward and away from said conveyor plane, a drive roller rotatably mounted on said frame, an actuating mechanism for translating said frame toward said conveyor plane, drive means for simultaneously and individually applying rotational torque to said roller and driving said actuating mechanism to effect translation of said frame toward said conveyor plane; a portion of said drive means being operable by said actuating mechanism, as an incident to movement of said frame away from said conveyor plane, to cause retrograde rotation of said roller, and means for applying a yielding restraint upon rotation of said roller proportional in magnitude to the speed of rotation of said roller, said last named means comprising a liquid-containing reservoir disposed coaxially with said roller adjacent one end thereof, a first series of spaced plates fixed within said reservoir, a second series of plates interspersed between said fixed plates and connected to and rotatable with said roller, both said fixed plates and said rotatable plates being at least partially immersed in the liquid in said reservoir.

* * * * *